US009294351B2

(12) United States Patent  
Mittal et al.

(10) Patent No.: US 9,294,351 B2
(45) Date of Patent: Mar. 22, 2016

(54) DYNAMIC POLICY BASED INTERFACE CONFIGURATION FOR VIRTUALIZED ENVIRONMENTS

(75) Inventors: Anuraag Mittal, San Jose, CA (US); Prasad Miriyala, Union City, CA (US); Mark Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/293,421

(22) Filed: Nov. 10, 2011

(65) Prior Publication Data

US 2013/0125112 A1    May 16, 2013

(51) Int. Cl.
   G06F 9/455    (2006.01)
   H04L 12/24    (2006.01)

(52) U.S. Cl.
   CPC .................. *H04L 41/0813* (2013.01)

(58) Field of Classification Search
   CPC .................................... G06F 9/45533
   USPC ............................................. 718/1
   See application file for complete search history.

(56) References Cited

U.S. PATENT DOCUMENTS

| | | |
|---|---|---|
| 6,247,057 B1 | 6/2001 | Barrera, III |
| 6,286,040 B1 | 9/2001 | Durham et al. |
| 6,363,081 B1 | 3/2002 | Gase |
| 6,760,804 B1 | 7/2004 | Hunt et al. |
| 7,222,173 B2 | 5/2007 | Goodman |
| 7,516,211 B1 | 4/2009 | Gourlay et al. |
| 2003/0014524 A1 | 1/2003 | Tormasov |
| 2005/0108723 A1 | 5/2005 | Burckart et al. |
| 2005/0232256 A1 | 10/2005 | White et al. |
| 2006/0230219 A1 | 10/2006 | Njoku et al. |
| 2006/0230407 A1 | 10/2006 | Rosu et al. |
| 2007/0028244 A1 | 2/2007 | Landis et al. |
| 2008/0163207 A1 | 7/2008 | Reumann et al. |
| 2008/0201414 A1 | 8/2008 | Amir Husain et al. |
| 2008/0225877 A1 | 9/2008 | Yoshida |
| 2008/0271016 A1 | 10/2008 | Chess et al. |
| 2008/0275975 A1 | 11/2008 | Pandey et al. |
| 2009/0025007 A1 | 1/2009 | Hara et al. |
| 2009/0288135 A1 | 11/2009 | Chang et al. |
| 2009/0292858 A1 | 11/2009 | Lambeth et al. |
| 2009/0328193 A1* | 12/2009 | Moore et al. ................... 726/15 |
| 2010/0046531 A1 | 2/2010 | Louati et al. |
| 2010/0131636 A1 | 5/2010 | Suri et al. |
| 2010/0165877 A1 | 7/2010 | Shukla et al. |
| 2010/0214949 A1 | 8/2010 | Smith et al. |
| 2011/0085563 A1* | 4/2011 | Kotha et al. ................... 370/401 |
| 2011/0202675 A1* | 8/2011 | Faulk, Jr. ...................... 709/238 |

(Continued)

OTHER PUBLICATIONS

Context, Wiktionary, retrieved on Aug. 25, 2014.*
Associate, Wiktionary, retrieved on Aug. 26, 2014.*
Association, Wiktionary, retrieved on Aug. 26, 2014.*
Comprise, wiktionary, retrieved on Feb. 13, 2015, https://en.wiktionary.org/wiki/comprise.*

(Continued)

*Primary Examiner* — Emerson Puente
*Assistant Examiner* — Charlie Sun
(74) *Attorney, Agent, or Firm* — Cindy Kaplan (57) ABSTRACT

In one embodiment, a method includes receiving static profiles each comprising one or more properties of an operating environment, receiving a dynamic profile for identifying a configuration of an interface based on the static profile associated with said dynamic profile, associating the dynamic profile with one of the static profiles based on the operating environment of the interface, and automatically updating the association upon identifying a change in the operating environment. An apparatus is also disclosed.

19 Claims, 6 Drawing Sheets

(56) References Cited

U.S. PATENT DOCUMENTS

| | | | |
|---|---|---|---|
| 2011/0239268 A1* | 9/2011 | Sharp et al. | 726/1 |
| 2011/0255538 A1* | 10/2011 | Srinivasan et al. | 370/392 |
| 2012/0039175 A1* | 2/2012 | Sridhar et al. | 370/236 |
| 2012/0054624 A1* | 3/2012 | Owens et al. | 715/735 |
| 2012/0180042 A1* | 7/2012 | Tsirkin et al. | 718/1 |
| 2012/0201169 A1* | 8/2012 | Subramanian et al. | 370/255 |
| 2013/0031544 A1* | 1/2013 | Sridharan et al. | 718/1 |

OTHER PUBLICATIONS

Interpret, wiktionary, retrieved on Feb. 13, 2015, https://en.wiktionary.org/wiki/interpret.*
Define, wiktionary, retrieved on Feb. 13, 2015, https://en.wiktionary.org/wiki/define.*
Virtual machine, retrieved on Feb. 13, 2015, http://en.wikipedia.org/wiki/Virtual_machine.*
IBM Systems and Technology: "IBM VMready", Oct. 31, 2011.

* cited by examiner

DYNAMIC POLICY BASED INTERFACE CONFIGURATION FOR VIRTUALIZED ENVIRONMENTS

TECHNICAL FIELD

The present disclosure relates generally to communication networks, and more particularly, to policy based interface configuration for virtualized environments.

BACKGROUND

Virtualization is a technology that allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware. In a virtual machine environment, virtual switches provide network connectivity between virtual machine interfaces and physical interfaces on the servers. The speed and capacity of today's servers allow for a large number of virtual machines on each server, which results in many virtual interfaces that need to be configured. The virtual machines may be moved between servers, in which case changes to policies for the virtual machines may be needed. There may also be network changes that result in policy changes for physical interfaces. In conventional systems, these policy changes typically require manual intervention or additional management tools, resulting in increased management complexity.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving static profiles each comprising one or more properties of an operating environment, receiving a dynamic profile for identifying a configuration of an interface based on the static profile associated with said dynamic profile, associating the dynamic profile with one of the static profiles based on the operating environment of the interface, and automatically updating the association upon identifying a change in the operating environment.

In another embodiment, an apparatus generally comprises memory for storing static profiles each comprising one or more properties of an operating environment and a dynamic profile for identifying a configuration of an interface based on the static profile associated with the dynamic profile, and a processor for associating the dynamic profile with one of the static profiles based on the operating environment of the interface, and automatically updating the association upon identifying a change in the operating environment.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a virtual environment, virtual switches provide networking connectivity between virtual machine interfaces and physical interfaces on servers. The virtual machines share hardware resources without interfering with each other so that several operating systems and applications can run at the same time on a single computer. The virtual machines may be used, for example, in a virtual infrastructure to dynamically map physical resources to business needs. Each server may include many virtual machines and a single virtual switching domain may encompass many servers, resulting in a large number of virtual interfaces (ports) to be configured.

In one example, a network administrator configures the virtual switches and the connectivity constraints for the virtual ports on the virtual switch using a virtual switch interface to define port profiles. A server (system) administrator configures the virtual machines and identifies the virtual ports to which the virtual machine interfaces should be connected.

Virtual machine policies may need to be modified following migration of the virtual machine due to the change in location of the virtual machine. While policy changes were limited when the mobility domain was a layer 2 domain restricted to a single network (e.g., data center), the need for policy changes in today's networks is increasing. For example, policy changes may be needed following a virtual machine move between data centers or control planes or to a physical server with different resources, network services, or access to network segments. Policy changes to physical network interfaces may also be needed due to changes in hardware or network topology (e.g., following a network failure). In conventional systems, these policy changes typically require additional management tools or manual intervention to modify, the policy assignment, which increases server administrator and network administrator interaction and management complexity.

The embodiments described herein reduce management complexity by dynamically updating policies for an interface based on the operating environment of the interface. The operating environment may be, for example, a server hosting the virtual machine associated with the virtual interface, a virtual machine associated with the virtual interface, or physical device in communication with the physical interface. The policies may vary, for example, based on properties of the server (e.g., location, service IP address, tier of service). This allows a virtual machine to have different policies in effect based on the server that the virtual machine is hosted on. As described below, network policies can be configured once and automatically updated following virtual machine migration or other network change. The interface configuration is interpreted based on a context (operating environment). Management complexity is reduced by removing the need to define network policy for the same virtual machine in multiple places and decreasing server administrator and network administrator interaction. The embodiments may be used, for example, in an enterprise or service provider environment.

Figure 1:
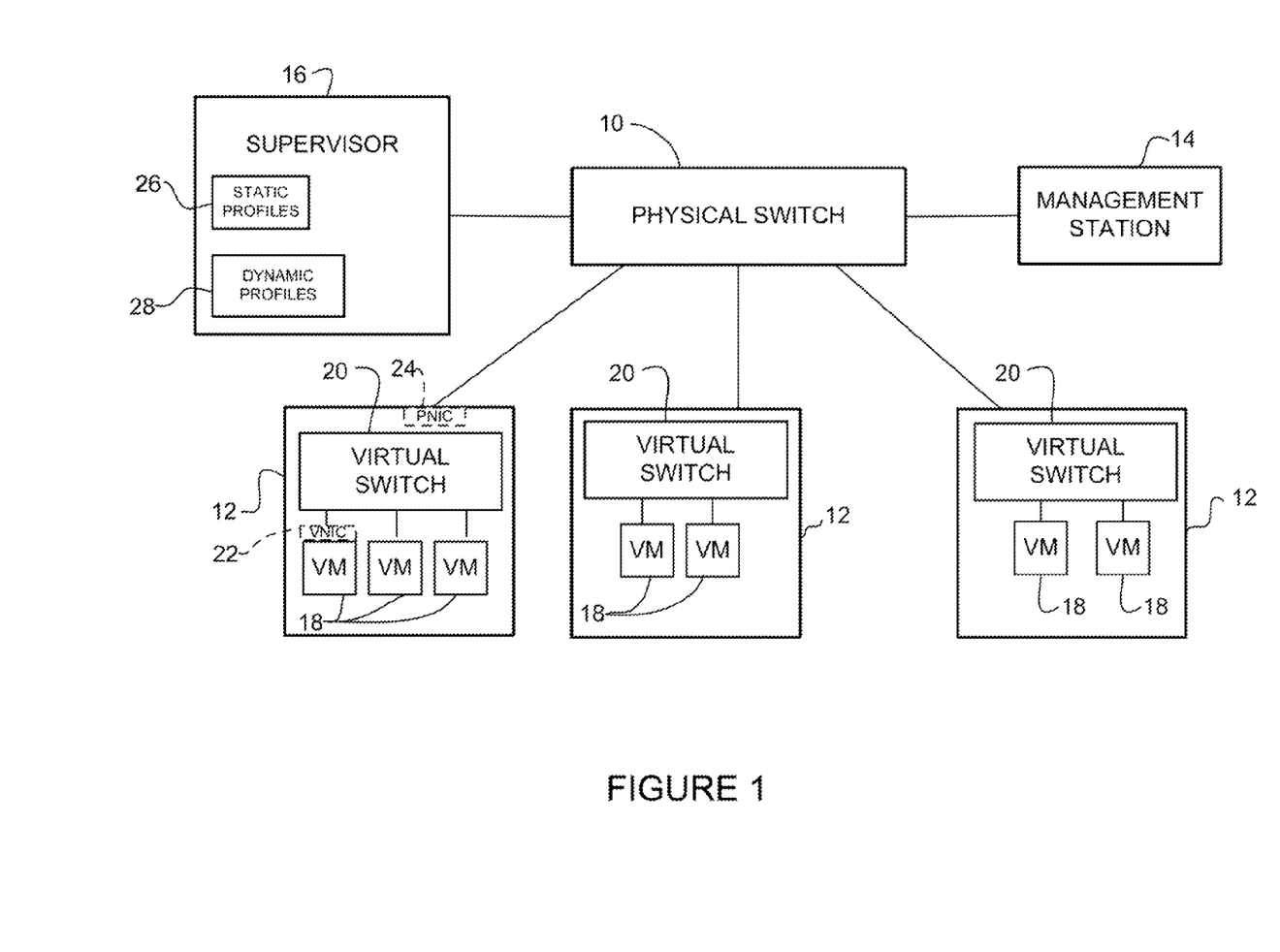
FIG. 1 illustrates an example of a network in which embodiments described herein may be implemented.

Referring now to the drawings, and first to FIG. 1, an example of a network in which embodiments described herein may be implemented is shown. For simplification, only a small number of nodes are shown. The network includes a physical switch 10 in communication with servers (host, physical machine) 12, management station 14, and supervisor (e.g., Virtual Supervisor Module (VSM)) 16. The management station 14 may be, for example, a virtualization management platform such as VMware Virtual Center management station, available from VMware of Palo Alto, Calif. or any other management device. The supervisor 16 may be located in a physical appliance (e.g., server) in communication with the servers 12 and management station 14 via physical switch 10, or the VSM may be a virtual appliance (e.g., virtual machine) installed at one of the servers 12 or another server or network device in the network. In one embodiment, the virtual supervisor module 16 provides for management of network policies through the use of static and dynamic profiles 26, 28 as described in detail below.

Each server 12 comprises a virtual switch (also referred to herein as a Virtual Ethernet Module (VEM)) 20 and one or more virtual machines 18. A virtual machine monitor such as hypervisor (not shown) dynamically allocates hardware resources to the virtual machines 18. The virtual machines 18 may be moved (also referred to as vMotion, live migration, or virtual machine migration) between servers 12 and across layer 2 or layer 3 boundaries, based on traffic patterns, hardware resources, network services, or other criteria.

The virtual machines 18 are in communication with the virtual switch 20 via virtual network interface cards (VNICs) 22 which connect to a virtual Ethernet interface at the virtual switch. The server 12 includes an Ethernet port for each physical network interface card (PNIC) 24. The Ethernet ports may be aggregated at a port channel. The virtual switches 20 are in communication with the network via the physical Ethernet interfaces. The virtual switch 20 switches traffic between the virtual machines 18 and the physical network interface cards 24. For simplification, only one virtual network interface card 22 and one physical network interface card 24 are shown in FIG. 1. Each virtual machine 18 is associated with one or more virtual interface 22 and each physical server 12 is associated with one or more physical interface 24.

In one embodiment, the virtual switches 20 are part of a distributed virtual switch residing in the physical hosts 12 hosting the virtual machines 18. The distributed virtual switch includes the virtual switches (VEMs) 20 installed at the servers 12 and the virtual supervisor module 16. The VSM 16 is configured to provide control plane functionality for the virtual machines 18. The virtual switch 20 provides switching capability at the server 12 and operates as a data plane associated with the control plane of the VSM 16. The VSM 16 and virtual switch (VEM) 20 operate together to form the distributed virtual switch as viewed by the management station 14. It is to be understood that the distributed virtual switch shown in FIG. 1 is only an example and that other virtualization systems having different configurations or components may be used, without departing from the scope of the embodiments.

In one embodiment, virtual switch profiles (static profiles) 26 are used to assign properties and policies for the servers 12, and context-aware port profiles (dynamic profiles) 28 are used to map features and policies to specific ports based on properties associated with the physical server. This allows a virtual machine 18 attached to the same profile to have different active policies based on the server 12 on which the virtual machine is operating. In one embodiment, the profiles 26, 28 are stored at the virtual supervisor module 16. The profiles 26, 28 may also be stored at the management station 14 or any network device on which the distributed switch is operating or in communication with. The term 'profile' as used herein may refer to any container or object used to define policies or features that may be applied to an interface (virtual or physical).

It is to be understood that the network shown in FIG. 1 and described herein is only one example and that the embodiments described herein may be implemented in networks having different network topologies and network devices, without departing from the scope of the embodiments.

Figure 2:
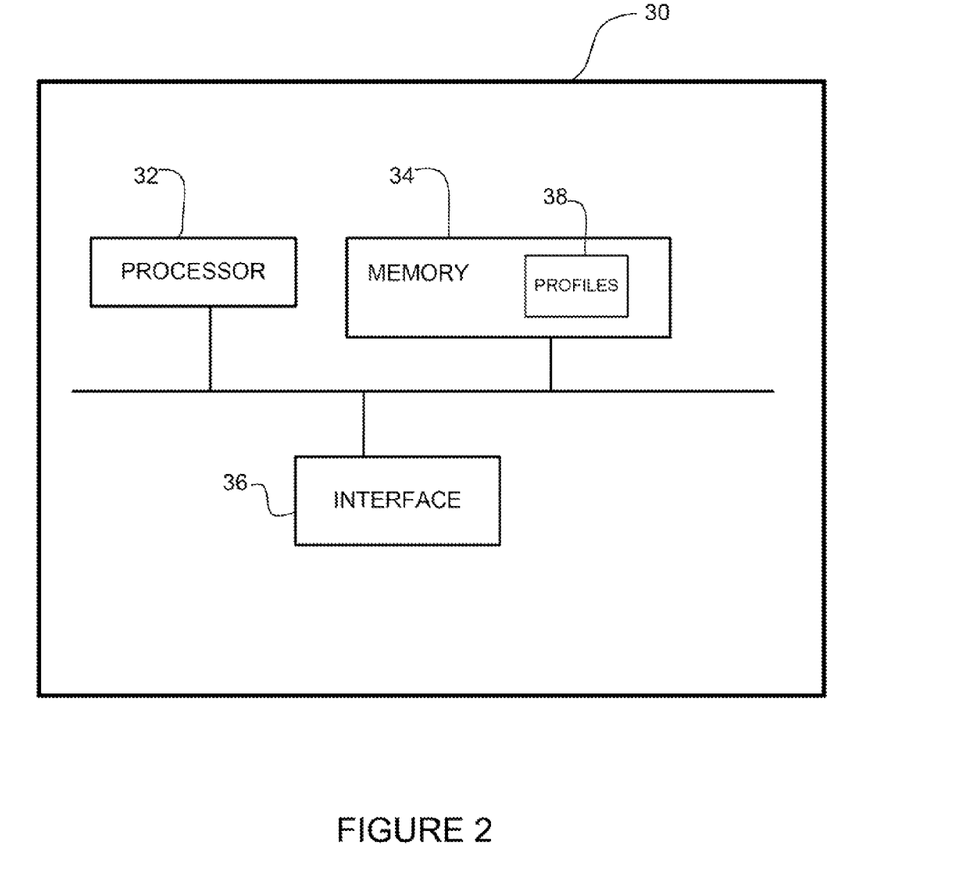
FIG. 2 depicts an example of a network device useful in implementing embodiments described herein.

An example of a network device (e.g., server, appliance) 30 that may be used to implement embodiments described herein is shown in FIG. 2. In one embodiment, network device 30 is a programmable machine that may be implemented in hardware, software, or any combination thereof. The device 30 includes one or more processors 32, memory 34, and network interface 36. Memory 34 may be a volatile memory or non-volatile storage, which stores various applications, modules, and data for execution and use by the processor 32. Memory 34 may include, for example, profiles 38 (e.g., virtual switch profiles, context-aware port profiles).

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise one or more interfaces (linecards, ports) for receiving data or transmitting data to other devices. The interface 36 may include, for example, an Ethernet interface for connection to a computer or network.

It is to be understood that the network device shown in FIG. 2 and described above is only an example and that network devices having different components and configurations may be used without departing from the scope of the embodiments.

In one embodiment, a construct (referred to herein as virtual switch profile or static profile) is provided that describes physical servers and their properties. The virtual switch profile is associated with a port profile (referred to herein as a context-aware port profile or dynamic profile). This allows a virtual machine attached to a context-aware port profile to have different policies in effect based on the server 12 the virtual machine is hosted on.

The virtual switch profile (static profile) 26 is a static container for properties (policies, features, rules, attributes) associated with the physical server 12 on which the virtual switch 20 is operating. The virtual switch profile 26 defines the context in which policies are interpreted. The virtual switch profile 26 includes, for example, learned properties such as server cluster, number of CPUs, memory, host name, domain name, management IP address, or network service device IP address, and assigned properties or policies such as location (e.g., San Jose), maximum number of virtual machines, ACLs (access control lists), etc. The virtual switch profile 26 may contain policies that apply across all ports (interfaces) 22 on a virtual switch 20 or rules that define members of a profile based on learned properties (e.g., all virtual switches with a domain name that identifies a specific location). The port profile or interface configuration for one or more ports may override a virtual switch profile policy that applies across all ports of the virtual switch 20. Manual mapping or rules may be used to define the virtual switch's inheriting profile. For example, members may include all virtual switches where management IP is in subnet X, all virtual switches not in cluster Y, or all virtual switches where a name matches a specific domain name. Virtual switches within a site may also be in different profiles.

The following is an example of a virtual switch profile:
Nx1000(conf)# vem-profile SJC-VEM
Nx1000(conf-vem-prof)#profile membership match domain sjc.cisco.com
Nx1000(conf-vem-prof)# location SJC
Nx1000(conf-vem-prof)# vn-service ip address 172.1.1.102

The properties for the virtual switch profile SJC-VEM in the above example include domain name (sjc.cisco.com), location (San Jose (SJC)), and service device IP address (172.1.1.102).

The virtual switch profile is one example of a context in which policies may be interpreted. The static profiles may also include other contexts, such as virtual machine, user, network, domain, or other operating environment. The context-aware profiles described below may be resolved based on one or more contexts (e.g., virtual switch profile, virtual machine profile, virtual switch and virtual machine profiles)

The context-aware port profiles (dynamic profiles) 28 are dynamic policy container objects that are interpreted based on properties associated with a context. The context-aware port profiles 28 evaluate the effective configuration of a port (virtual interface, physical interface) based on the associated static profile 26 (e.g., virtual switch profile). The dynamic profiles may be applied to an interface in place of (or in addition to) regular (non-context aware) port profiles. Port configuration policies may include, for example, VLAN and PVLAN settings, ACLs, QoS (quality of service) policy, port security, rate limits, or any other configuration parameters that may be applied to an interface (e.g., virtual interface, physical interface, virtual machine associated with virtual interface, physical device associated with physical interface).

There are various ways to link (associate) the context-aware port profile 28 to a context (e.g., virtual switch profile) 26. Two examples are described below.

In a first example, a context is defined for each group of virtual switches (e.g., context-foo, context-bar in the following example) and policies are defined for the virtual switches within the port profile definition. Multiple profiles may use the same context.

Context-aware port profiles:
Nx1000(conf)#Port-profile type context context-foo
Nx1000(conf-port-prof)switchport access vlan 100
Nx1000(conf-port-prof)vn-service ip address a.b.c.d
Nx1000(conf)#Port-profile type context context-bar
Nx1000(conf-port-prof)switchport access vlan 200
Nx1000(conf-port-prof)vn-service ip address w.x.y.z
Virtual switch profiles:
Nx1000(conf)#vem-profile SJC
Nx1000(conf-vem-profile)#location SJC
Nx1000(conf-vem-profile)#context1 context-foo
Nx1000(conf)#vem-profile RTP
Nx1000(conf-vem-profile)#location RTP
Nx1000(conf-vem-profile)#context1 context-bar The port-profile type context in each context-aware port profile group above is a static container that cannot inherit other profiles and is by itself not context-aware.

In a second example for linking the port profile to the virtual switch profile, a context variable (e.g., context 1, context 2 in following example) is defined for a port profile and defined within each virtual switch profile. The policies are then associated with the context variable (e.g., associate vem-profile SJC with context 1 or vem-profile RTP with context 2 in the following example).

Context-aware port profiles:
Nx1000(conf)#Port-profile type context context-foo
Nx1000(conf-port-prof)switchport access vlan 100
Nx1000(conf-port-prof)profile context 1
Nx1000(conf-port-prof)associate vem-profile SJC
Nx1000(conf-port-prof)inherit context-foo
Nx1000(conf-vem-profile)#vn-service ip address a.b.c.d
Nx1000(conf-port-prof)profile context 2
Nx1000(conf-port-prof)associate vem-profile RTP
Nx1000(conf-port-prof)switchport access vlan 200
Nx1000(conf-vem-profile)#vn-service ip address w.x.y.z
Nx1000(conf-port-prof)profile default
Nx1000(conf-port-prof)inherit context-foo
Virtual switch profiles:
Nx1000(conf)#vem-profile SJC
Nx1000(conf-vem-profile)#location SJC
Nx1000(conf)#-vem-profile RTP
Nx1000(conf-vem-profile)#location RTP
Nx1000(conf-vem-profile)#vn-service ip address u.v.w.x The 'profile default' provides a default context if no matching virtual switch profile exists.

It is to be understood that the format for the virtual switch profiles and context-aware port profiles and the methods used to link the virtual switch profiles to the context-aware port profiles described herein are only examples and that other formats and methods may be used without departing from the scope of the embodiments.

The profiles may encompass a large number of features. More than one dynamic profile may be selected for a given virtual network interface card, since there could be more than one set, with one set comprising a first set of features and another set comprising a second set of features, with these sets being orthogonal and additive.

Figure 3:
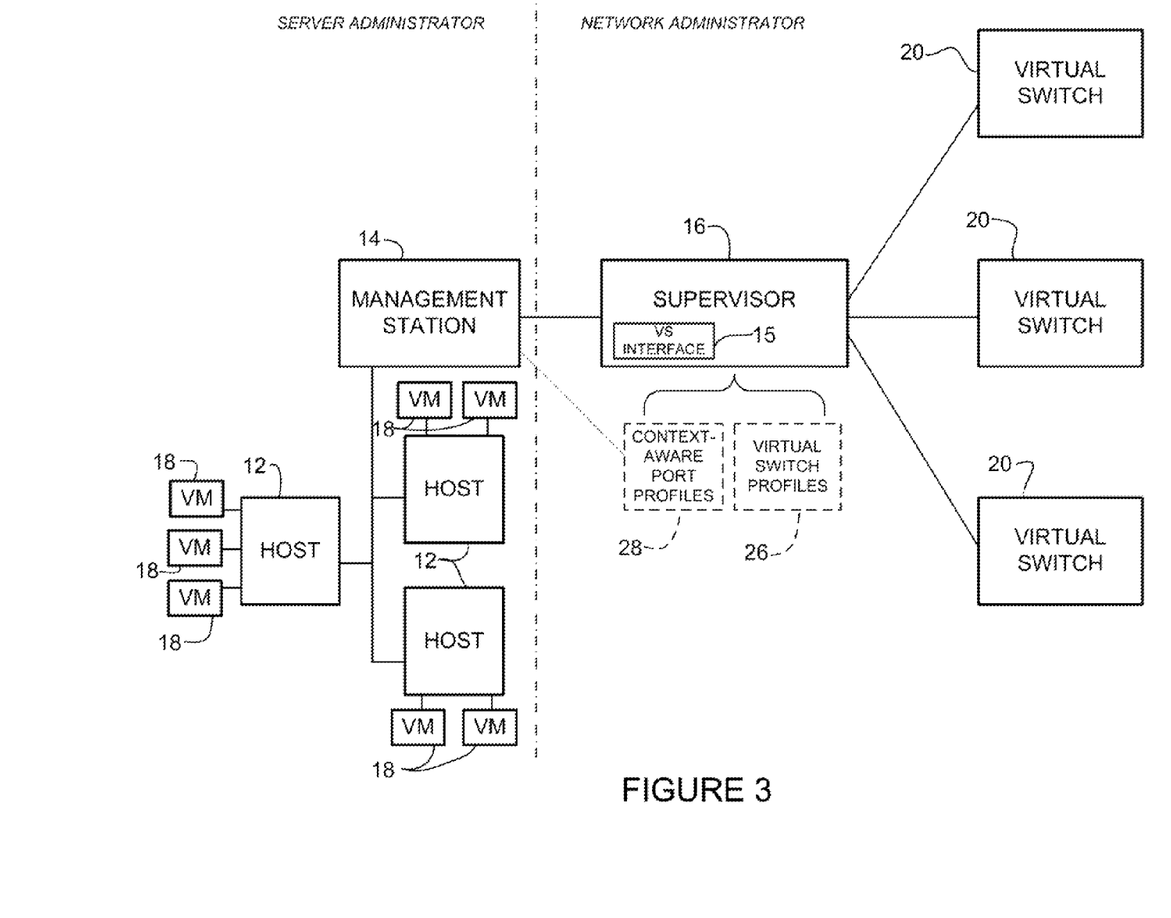
FIG. 3 illustrates server administrator and network administrator interaction with components in the network of FIG. 1.

FIG. 3 is a block diagram illustrating server administrator and network administrator interaction with components in the network of FIG. 1. In one example, the network administrator configures the virtual switches 20 and the connectivity constraints for the virtual ports on the virtual switch using a virtual switch interface 15 to define port profiles at the supervisor 16. The network administrator may define the profiles for the virtual machines 18 to connect to and define specific policies based on physical servers 12 the virtual machines can be located on. The port profiles may be defined using a command-line interface (CLI) for example.

Once the port profiles are defined at the supervisor 16, the port profiles (or port groups) may be transmitted to the management station 14. The port profiles are exported to the management station 14 so that the server administrator can choose which policy to use to define the connectivity constraints for the virtual machine interfaces. The server administrator chooses which configuration policy to use and attaches a port profile (or port group) to a virtual machine interface (or physical interface). The server administrator may configure the virtual machines 18 and determine which virtual ports to connect to which virtual machine interfaces using the management station 14. This information is then passed to the virtual switch (e.g., supervisor 16) for configuration of the ports 22, 24. The server administrator only needs to connect a virtual machine 18 to the context-aware port profile once. The virtual machine 18 gets its policy from the profile it is connected to and the policies for the physical server 12 it is hosted on. Regardless of where the virtual machine 18 moves to, the server administrator does not need to change the profile it is connected to and the network administrator does not need to change the configuration for the port profile that the virtual machine has.

The embodiments reduce server administrator and network administrator interaction since the only interaction needed is to identify the types of virtual machines hosted and details on physical servers such as location, etc. Network policy only needs to be configured once. The virtual machines 18 can move throughout the network and get desired behavior based on the operating environment in which the virtual machine is running. Also, the server properties that can be used to make policy decisions are exposed.

Figure 4:
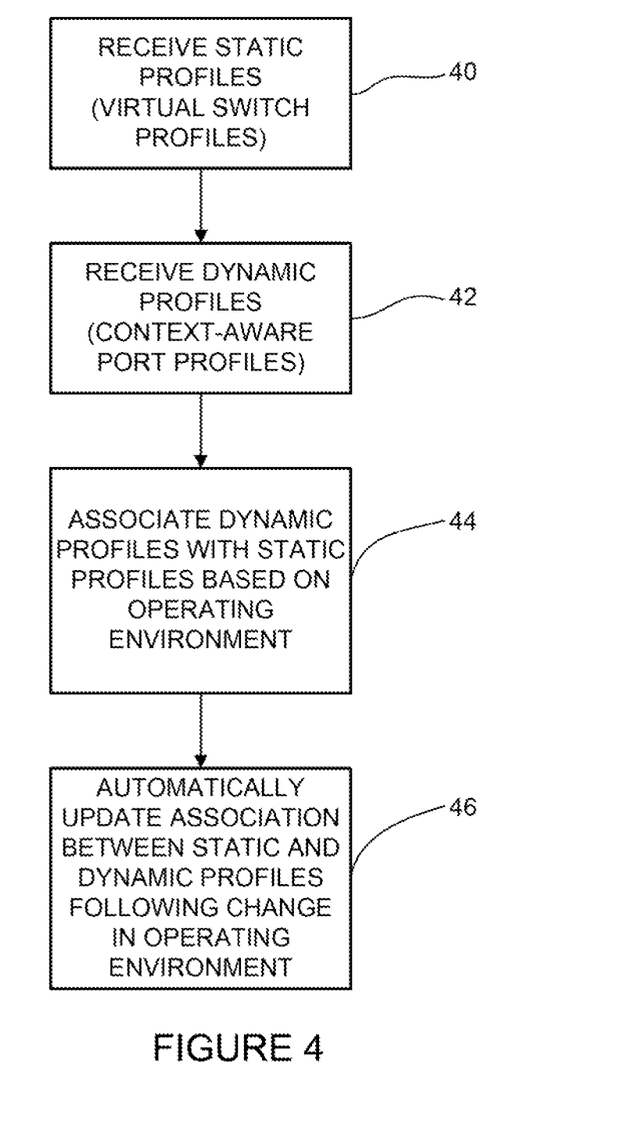
FIG. 4 is a flowchart illustrating an overview of a process for dynamic policy based interface configuration, in accordance with one embodiment.

FIG. 4 is a flowchart illustrating an overview of a process for dynamic policy based interface configuration, in accordance with one embodiment. At step 40, a network device (e.g., supervisor 16) receives static profiles (e.g., virtual switch profiles) 26 identifying properties (policies, rules, features, attributes) for a physical network device (e.g., server, host) 12 hosting virtual machines 18. The virtual switch profiles may be entered, for example, by a network administrator. Dynamic profiles (context-aware port profiles) 28 are received at step 42. The dynamic profile identifies (interprets) a configuration of an interface based on the static profile and other attributes associated with the dynamic profile. The server administrator may initially connect an interface to a dynamic profile via management station 14 and the supervisor 16 may receive the mappings from the management station 14, for example. The dynamic profiles are associated with static profiles based on an operating environment of the interface (e.g., server on which interface is located) (step 44). The association between the dynamic and static profiles allows the interface configuration to be interpreted based on properties of the physical network device that the virtual machine 18 is currently located on, or other context. For example, the virtual machine 18 may receive its policy from the profile it is connected to and the policies for the physical server 12 it is currently hosted on.

Following a change in the operating environment (e.g., migration of the virtual machine, change in network topology), the association between the static profiles 26 and dynamic profile 28 is updated (step 46). The interface is configured, for example, based on the profiles for the virtual switch 20 that the virtual machine 18 is connected. The association between the dynamic and static profiles may also be updated for a physical interface following a network topology change (e.g., change in hardware at remote end of physical link, failure of primary link). Regardless of where the virtual machine 18 moves, the server administrator does not need to change the profile it is connected to and the network administrator does not need to change the configuration for the port profile.

It is to be understood that the process shown in FIG. 4 is only an example and that steps may be modified, reordered, or combined, without departing from the scope of the embodiments.

The virtual machine 18 may move, for example, from one server 12 to another server in the same network or a different network, across the same or different control planes or virtual switch domains, or to a new server with limited resources, different services, or access to network segments. The following examples illustrate how context-aware port profiles may be used to associate a virtual machine 18 with new policies following migration of the virtual machine.

Figure 5:
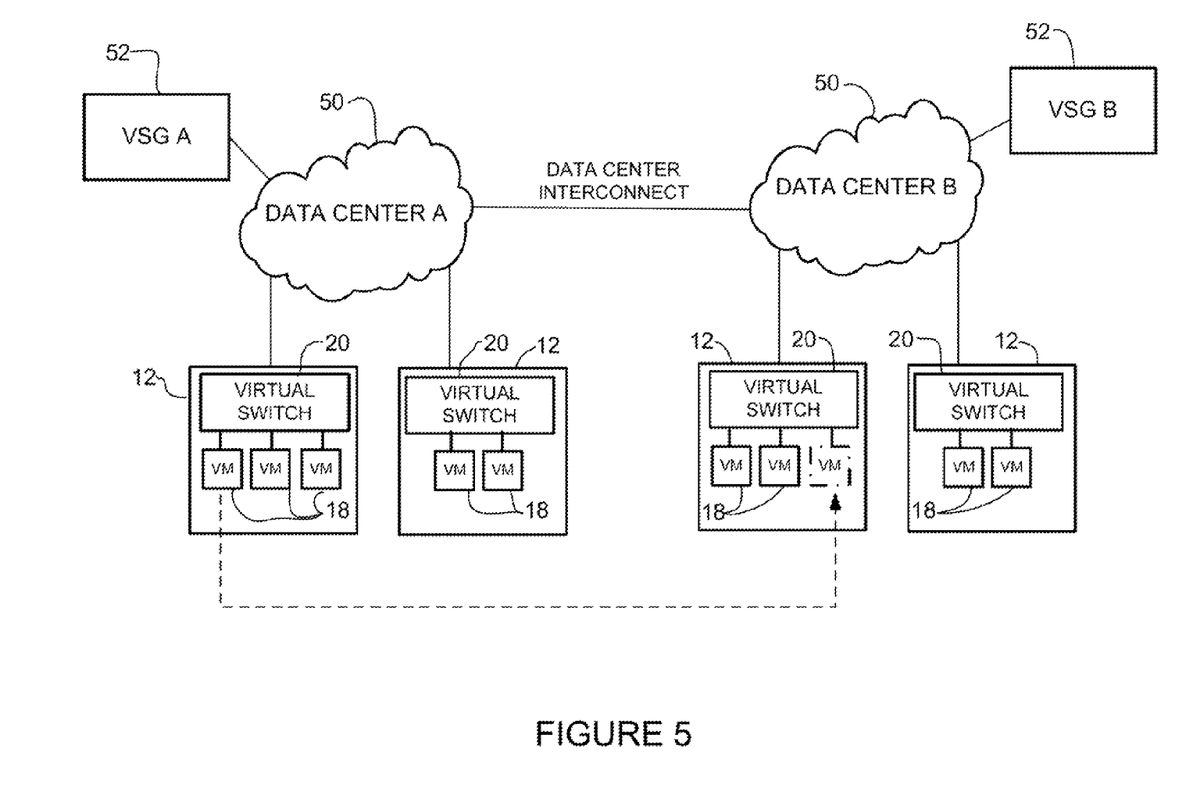
FIG. 5 illustrates an example of virtual machine migration between data centers.

FIG. 5 illustrates migration of the virtual machine 18 from a first server 12 in one data center (data center A) 50 to a second server in another data center (data center B). The two data centers 50 are in communication across a data center interconnect which may span one or more networks. Each data center 50 uses a different virtual security gateway (VSG A, VSG B)) 52. Traffic transmitted to or from the virtual machines 18 or from virtual machine to virtual machine is redirected to the virtual security gateway 52. The virtual security gateway enforces policies to provide security compliance and trusted access for virtual data centers and cloud computing environments. When the virtual machine 18 moves from data center A to data center B, the context-aware port profile for the virtual interface attached to the virtual machine associates with the virtual switch profile for the server 12 located in data center B, which identifies the service IP address for VSG B. This eliminates the need to redirect traffic over the data center interconnect.

The virtual security gateway 52 shown in FIG. 5 is only one example of a network service device and the embodiments described herein may be used with other service devices to associate a virtual machine 18 with a service device based on the location of the virtual machine. Examples of network services that may vary based on virtual switch properties such as location include L2/L3 LISP (Locater/ID Separation Protocol), DHCP (Dynamic Host Configuration Protocol) relay, Netflow export, ACL logging source or destination IP address.

Figure 6:
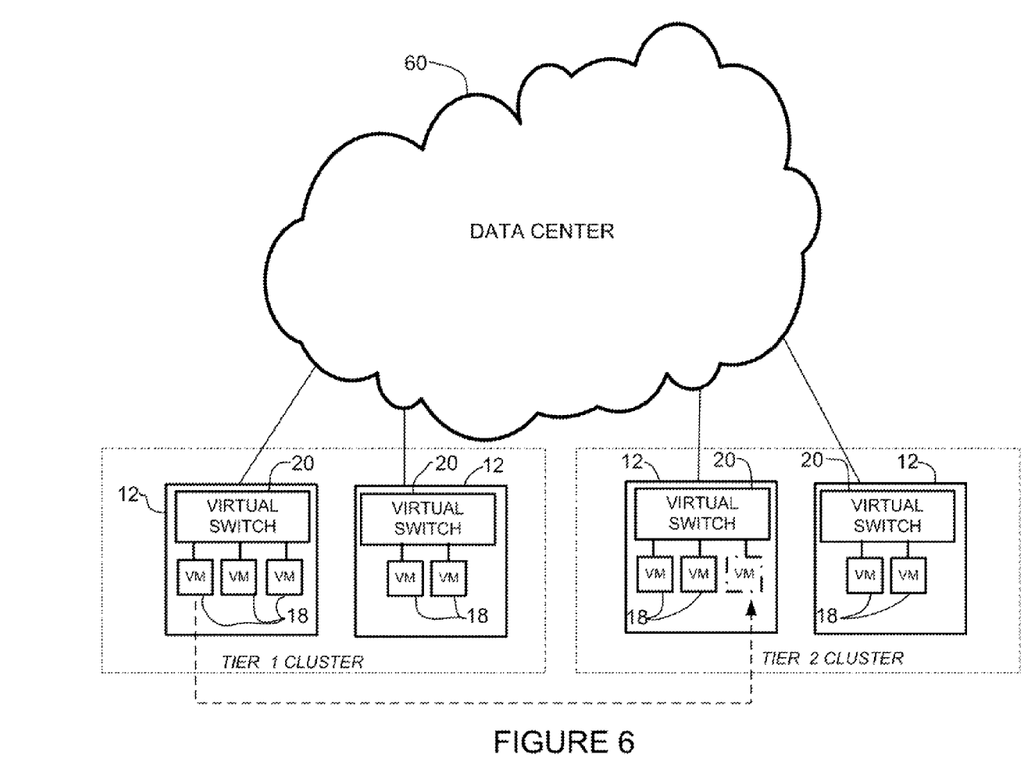
FIG. 6 illustrates an example of virtual machine migration between clusters of servers located in the same data center.

FIG. 6 illustrates an example in which virtual machines 18 get different tiers of services based on their location. In one example, data center 60 includes two tiers of server clusters (tier 1, tier 2). Virtual machines 18 hosted on servers 12 in the tier 1 cluster receive a different service level than virtual machines hosted on servers in the tier 2 cluster. The virtual machines 18 in both clusters may have common network policies (e.g., ACLs). In conventional systems, the network administrator creates one profile for the customer's virtual machine and then needs to create other profiles with a new service level when the customer service level changes. Also, the server administrator needs information on new profiles to connect the virtual machine to after moving to the new service level cluster. The embodiments described herein eliminate the need to create new profiles when the service level changes. The virtual machine 18 is simply moved to a new service level cluster and the context-aware port profiles automatically update the profile based on the new server 12 at which the virtual machine is located. For example, if a virtual machine in the tier 1 cluster is moved to the tier 2 cluster, the virtual machine does not need to be mapped to a different profile. After migration, the virtual machine 18 may get, for example, a different guaranteed bandwidth. The virtual machine 18 remains connected to a single port profile and can still get different tiers of service based on the server 12 they are hosted on (virtual switch connected to). This reduces server administrator and network administrator interaction.

Policy changes may also be due to authentication or user. For example, there may be a static policy 'cisco-eng-port-profile' and based on the user logged in, certain parameters may change for that policy dynamically along with location where the user logged in from.

The physical interfaces 24 (FIG. 1) may also be associated with one or more context-aware port profiles. These may be updated following network topology changes. For example, a change in upstream hardware (e.g., physical switch) or a failure in one of the physical links may result in changes to the profiles based on a new context.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
  receiving at a network device, static profiles each comprising one or more policies assigned to a virtual machine host for application to a virtual interface attached to a virtual machine, wherein said one or more policies provide security;
  receiving at the network device, a dynamic profile for identifying a configuration of the virtual interface based on one of said static profiles associated with said dynamic profile, wherein said static profiles define the virtual machine host in which said one or more policies are interpreted and said dynamic profile is interpreted based on said one or more policies assigned to the virtual machine host;
  linking said dynamic profile with one of said static profiles based on the virtual machine host;
  interpreting said configuration of the virtual interface based on said static profiles linked with said dynamic profile; and
  automatically updating said association between said dynamic profile and said static profile upon identifying a move of the virtual machine from the virtual machine host to another virtual machine host;
  wherein said static profiles are associated with virtual switches operating at the virtual machine hosts, the virtual machine attached to said dynamic profile comprising different policies, wherein said different policies are based on the virtual machine host at which where the virtual machine is located.

2. The method of claim 1 wherein said static profile properties comprise locations of the virtual machine hosts.

3. The method of claim 1 wherein said static profiles are associated with virtual switches operating at the virtual machine hosts.

4. The method of claim 1 wherein multiple dynamic profiles are selected and applied to said virtual interface and merged to form an interface configuration.

5. The method of claim 1 wherein said static profile properties comprise an address for a network service device.

6. The method of claim 1 wherein said static profiles comprise virtual switch profiles and said dynamic profiles comprise context-aware port profiles.

7. The method of claim 1 wherein the virtual machine host comprises a virtual switch in communication with a virtual machine comprising said virtual interface.

8. The method of claim 1 wherein said dynamic profile maps policies to said virtual interface based on said one or more properties associated with the virtual machine host.

9. The method of claim 1 wherein said static profiles and said dynamic profiles each define one or more policies that may be applied to said virtual interface.

10. The method of claim 1 wherein the virtual machine host comprises a physical server.

11. The method of claim 1 wherein policies of said virtual interface may vary based on the virtual machine host that said virtual interface is located.

12. The method of claim 1 wherein the different policies comprise different tiers of services.

13. Logic encoded on one or more non-transitory computer readable media for execution and when executed operable to:
  store static profiles each comprising one or more policies assigned to a virtual machine host for application to a virtual interface attached to a virtual machine, wherein said one or more policies provide security;
  store a dynamic profile for identifying a configuration of the virtual interface based on one of said static profiles associated with said dynamic profile;
  link said dynamic profile with one of said static profiles based on said virtual machine host;
  interpret said configuration of the virtual interface based on said static profiles associated with said dynamic profile; and
  automatically update said association between said dynamic profile and said static profile upon identifying a move of the virtual machine from the virtual machine host to another virtual machine;
  wherein said static profiles define the virtual machine host in which said one or more policies are interpreted and said dynamic profile is interpreted based on said one or more policies assigned to the virtual machine host; and
  wherein said static profiles are associated with virtual switches operating at the virtual machine hosts, the virtual machine attached to said dynamic profile comprising different policies, wherein said different policies are based on the virtual machine host where the virtual machine is located.

14. The logic of claim 13 wherein said static profile properties comprise locations of the virtual machine hosts.

15. The logic of claim 13 wherein said static profile properties comprise an address for a network service device.

16. The logic of claim 13 wherein the different policies comprise different tiers of services.

17. An apparatus comprising:
  memory for storing static profiles each comprising one or more policies assigned to a virtual machine host for application to a virtual interface attached to a virtual machine, a dynamic profile for identifying a configuration of the virtual interface based on one of said static profiles associated with said dynamic profile; and
  a processor for linking said dynamic profile with one of said static profiles based on the virtual machine host, interpreting said configuration of the virtual interface based on said static profiles associated with said dynamic profile, and automatically updating said association between said dynamic profile and said static profile upon identifying a move of the virtual machine from the virtual machine host to another virtual machine host;
  wherein said static profiles define the virtual machine host in which said one or more policies are interpreted and said dynamic profile is interpreted based on said one or more policies assigned to the virtual machine host, said policies providing security; and wherein said static profiles are associated with virtual switches operating at the virtual machine hosts, the virtual machine attached to said dynamic profile comprising different policies wherein said different policies are based on the virtual machine host where the virtual machine is located.

18. The apparatus of claim 17 wherein said association between said dynamic profile and said static profile allows a configuration of said virtual interface to be interpreted based on said properties of the virtual machine host.

19. The apparatus of claim 17 wherein the different policies comprise different tiers of services.

\* \* \* \* \*